Dec. 1, 1925.  
W. H. McCORMICK  
1,563,638  
UNIVERSAL MOUNTING AND HOIST FOR DUMPING TRUCK BODIES  
Filed Aug. 14, 1922  
3 Sheets-Sheet 1
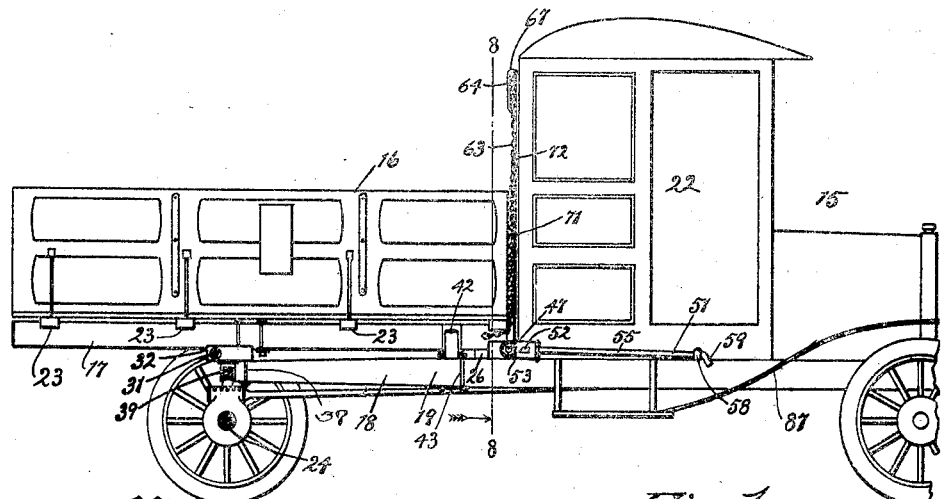
Fig. 1.
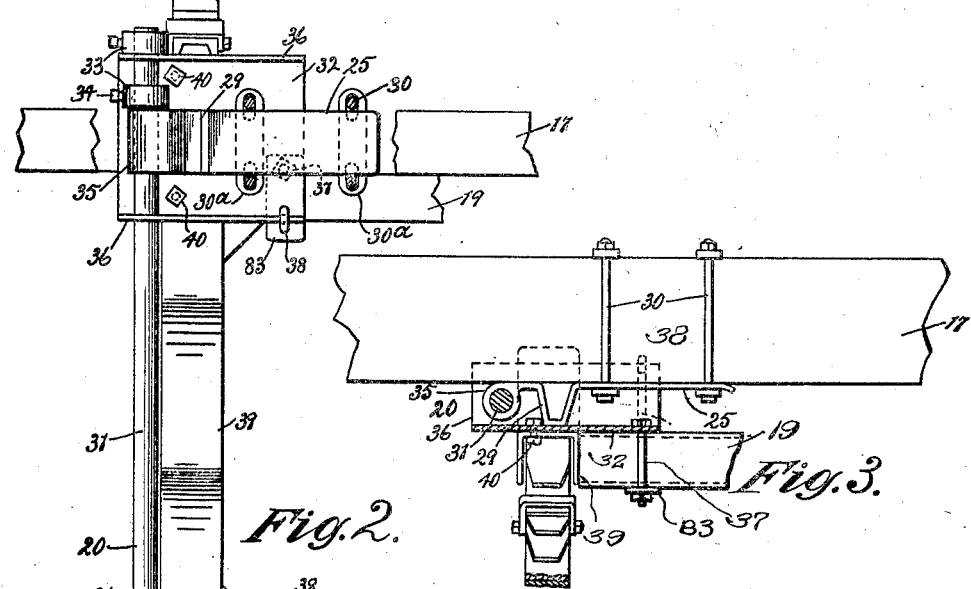
Fig. 2.   Fig. 3.
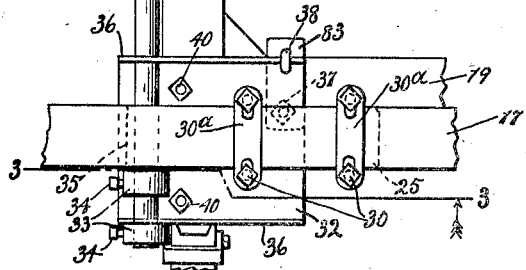
Inventor:
Wallace H. McCormick
By Gillson & Gillson
Attys.

Dec. 1, 1925.                                                     1,563,638
W. H. McCORMICK
UNIVERSAL MOUNTING AND HOIST FOR DUMPING TRUCK BODIES
Filed Aug. 14, 1922                       3 Sheets-Sheet 2

Inventor:
Wallace H. McCormick
By Gillson & Gillson
Attys.

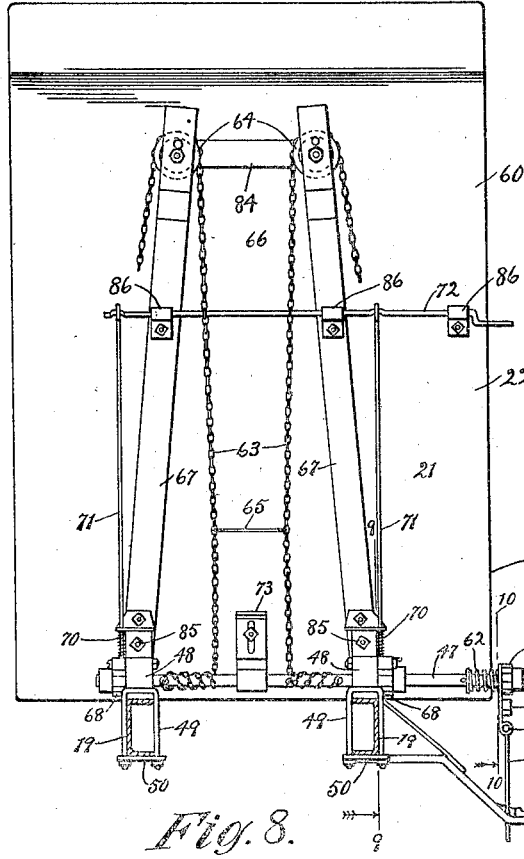

Patented Dec. 1, 1925.

1,563,638

UNITED STATES PATENT OFFICE.

WALLACE H. McCORMICK, OF STREATOR, ILLINOIS.

UNIVERSAL MOUNTING AND HOIST FOR DUMPING-TRUCK BODIES.

Application filed August 14, 1922. Serial No. 581,782.

*To all whom it may concern:*

Be it known that I, WALLACE H. MCCORMICK, a citizen of the United States, and resident of Streator, county of La Salle, and State of Illinois, have invented certain new and useful Improvements in Universal Mountings and Hoists for Dumping-Truck Bodies, of which the following is a specification, and which are illustrated in the accompanying drawings, forming a part thereof.

The invention relates to trucks, and especially to motor trucks having bodies which tilt for discharging the load through the rear end thereof. The chassis for automobile trucks frequently comes from the factory without any device or attachment for mounting a dump body thereon. This renders it desirable that a universal mounting be provided that is adapted for use with various sizes of chassis frames and bodies, and that can be easily mounted on any ordinary type of chassis frame.

One of the objects of the invention is to provide a hinge mounting that can be easily attached to chassis frames of different dimensions, and without the use of special tools or weakening the chassis frame by drilling or cutting the same.

Another object is to provide a hoist for tilting dump bodies that is adjustable for use with dump bodies and chassis frames of different dimensions.

In the accompanying drawings:

Fig. 1 is an elevational view of a truck equipped with the device of my invention;

Fig. 2 is a plan view of a portion of the chassis frame overlying the rear axle of the truck;

Fig. 3 is a sectional view on the line 3—3 of Fig. 2;

Fig. 8 is a view on line 8—8 of Fig. 1, with the truck body omitted;

Fig. 9 is a sectional view along the line 9—9 of Fig. 8;

Fig. 10 is a detail view on the line 10—10 of Fig. 8; and

Fig. 11 is a view of the truck body in tilted position.

Figure 4:
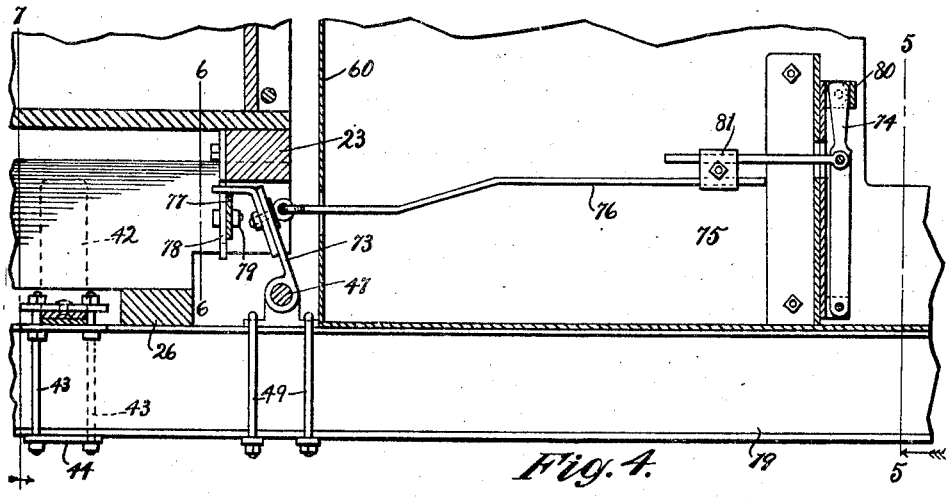
Fig. 4 is a fragmentary longitudinal sectional view of the rear of the cab and the front of the dump body.
Figure 6:
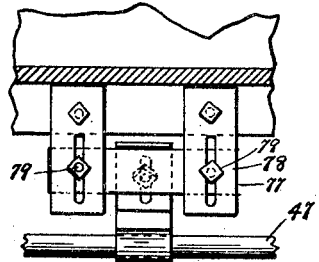
Fig. 6 is a sectional view on line 6—6 of Fig. 4.
Figure 5:
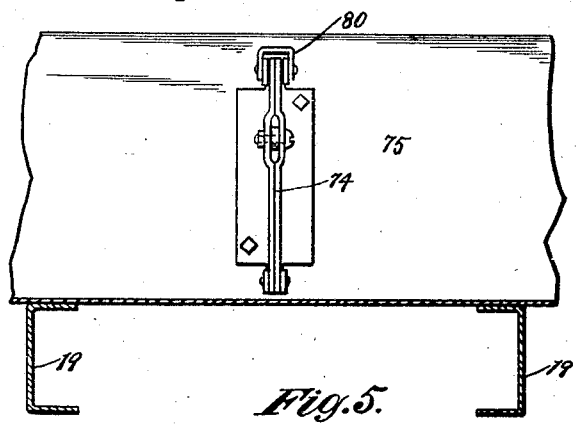
Fig. 5 is a view on the line 5—5 of Fig. 4.
Figure 7:
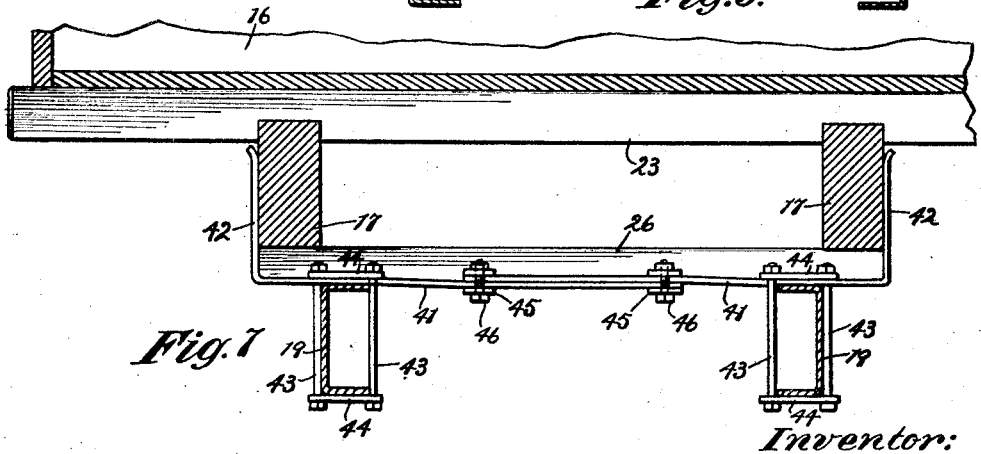
Fig. 7 is a sectional view on line 7—7 of Fig. 4.

Referring to the drawings, a truck 15 is shown equipped with a dump body 16 having longitudinal sills 17 normally resting directly on the chassis frame 18. The invention contemplates a hinge mounting 20 that carries the dump body load when the body 16 is tilted, and an improved hoist 21 preferably operable to tilt the body either from within or without the cab 22, both the mounting 20 and the hoist 21 being adjustable for use with chassis frames and truck bodies of various sizes.

The dump body 16 is preferably constructed to include a plurality of supporting cross sills, as 23, which in turn rest upon a pair of longitudinal sills 17. The spacing of the longitudinal sills 17 is preferably made to coincide with the spacing of side members 19 of the chassis frame 18, in order that the load from the dump body may normally be carried directly downward into the chassis frame.

Easy tilting of dump body 16, unobstructed by the chassis frame, is made possible by positioning the dump body to project a substantial distance over the rear axle 24 of the truck, thereby causing a relatively large proportion of the dump body load to be carried by the rear axle 24. It is desirable that this rear axle loading be concentrated on the chassis frame immediately over the rear axle, to avoid subjecting the side members 19 to unnecessary strain. This is accomplished by mounting a pair of hinge plates 25 on the under side of the longitudinal sills 17 above the rear axle 24, to serve as spacers between the sills and chassis frame 18, and thereby concentrating the loading transmitted from the sills to the frame. A cross-bar 26, positioned under the front end of the dump body 16 between longitudinal sills 17 and side members 19, likewise normally serves as a spacer and a load concentrating element.

Hinge plates 25 have their middle portion bent downwardly to form legs 29. These legs are preferably positioned immediately above the rear axle 24, each leg normally resting on a corresponding saddle block 32 which is bolted to the chassis frame 18. The front end of each hinge plate 25 is fastened to a corresponding sill 17, as by bolts 30 and cleats 30$^a$, the cleats being slotted to permit adjustment to sills of different widths. The rear end of plate 25 is shaped to form a hinge 35, rotatable about a hinge rod 31, extending through the flanges 36 of saddle blocks 32. Hinge rod 31 adjustably connects the saddle blocks 32, as by the outer slidable collars 33 and setscrews 34, thereby adapting the rod 31 and blocks 32 for mounting on chassis frames of different widths. Saddle blocks 32 are preferably fastened to side members 19 as by bolts 37, hook bolts 38, and cleats 83. Bolts 40 likewise secure blocks 32 to the end member 39 of the chassis frame.

Saddle blocks 32 are preferably made substantially wider than the hinge plates 25 that are positioned therein, to provide for adjustment of the plates, within the limits of the saddle blocks 32, to different spacing of sills 17. Hinge plates 25 are adjustably connected, as by the inner pair of slidable collars 33 and set-screws 34, mounted upon hinge rod 31. It is obvious that the entire hinge mounting 20 can be easily and quickly mounted on any chassis frame of the general type shown, without requiring the use of any special tools, and without weakening the chassis frame by punching or drilling any considerable number of holes therein.

Tilting of the dump body 16 causes all of its load to be carried through longitudinal sills 17 and plates 25 into hinge rod 31. Hinge rod 31 is preferably placed as close as possible to the end member 39, to minimize the bending effect on the chassis frame of the load from the tilted dump body.

Dump body 16 is held against lateral movement by a two-piece standard 41, provided with vertical arms 42. These arms have their upper ends flared outwardly to serve as a guide to the front end of the dump body while it is being lowered from a tilted position. Standard 41 is provided with bolts 43 and cleats 44 for fastening to side members 19 without requiring any punching or drilling of holes. Adjustability of standard 41 to different widths of chassis frames and dump bodies is secured by providing two sets of cleats 45 and bolts 46, which clamp the two pieces of the standard together.

Hoist 21 includes a main shaft 47, journaled in a pair of pedestal blocks 48. These blocks are fastened to side members 19 by U-bolts 49 and cleats 50, and are positioned adjacent to the rear wall 60 of the cab 22. Rotation of shaft 47 is accomplished by manual operation of a lever 51, having a pawl 52 engaging a ratchet wheel 53, fixedly mounted near one end of the shaft. Lever 51 comprises a slotted plate 54, and a handle 55 pivotally connected to plate 54, as by a bolt 56. Shaft 47 extends through a slot 57 in plate 54, thereby permitting lever 51 to be moved radially relative to shaft 47, as well as rotated. Pawl 52 is fixedly mounted on plate 54, so that the radial movement of the lever relative to shaft 47 causes engagement and disengagement of pawl 52 with the ratchet wheel 53.

A holder 58 is provided on the side of cab 22, as a receptacle for handle 55 when the lever 51 is not in use. To insure disengagement of pawl 52 from ratchet wheel 53 when handle 55 is in the holder, the outer end of the handle is bent to form a hook 59, which engages the holder only when the lever is pulled outwardly and when so engaged fastens the lever in its extreme outer position relative to shaft 47. When the lever is not in use it can also be disposed of by pushing it down until handle 55 engages the inner edge of fender 87.

The pivotal mounting of handle 55 on bolt 56 permits the handle to be swung close to or away from cab 22, as desired, so that the lever 51 may be actuated to rotate shaft 47 either from within or without cab 22. A spiral spring 62, mounted on shaft 47, yieldingly holds plate 54 in contact with ratchet wheel 53.

An upright frame 66 is bolted to the rear wall 60 of cab 22, to provide a support for pulleys 64, mounted on the upper end of the frame. A pair of chains 63 extend over pulleys 64, each having one end wound about shaft 47 and the other end fastened to the front end of dump body 16. Tilting of the dump body 16 results from rotation of shaft 47 by causing the chains 63 to wind on the shaft and lift the front end of the dump body. A rod 65 holds the chains 63 close together at a point above their winding portion, and thereby causes the chains to wrap spirally about the shaft 47.

Frame 66 comprises a pair of upright plates 67, pivotally connected at their upper ends to a cross bar 84. The frame is supported by pedestal blocks 48, mounted on side members 19 of the chassis frame, the lower ends of plates 67 being fastened to the pedestal blocks, as by bolts 85. The pivotal connection of plates 67 to cross-bar 84 adapts plates 67 to connect with and be supported by pedestal blocks of different spacings.

Shaft 47 is normally held against rotation in a direction to unwind chains 63, by providing a pair of ratchet wheels 68, adjustably fastened to the shaft 47 adjacent the pedestal blocks 48. Pawls 69, pivotally mounted on pedestal blocks 48, are normally held in engagement with ratchet wheels 68 by springs 70, to permit shaft 47 to rotate in a direction to wind up chains 63, and to prevent rotation of the shaft in the opposite direction. When it is desired to rotate shaft 47 to unwind chains 63, pawls 67 are lifted by means of rods 71 on which springs 70 are mounted. Rods 71 are connected at their upper ends to a crank shaft 72, rotatably mounted on the frame 66 and back wall 60 of cab 22, as by bearings 86. Rotation of shaft 72 lifts rods 71, thereby disengaging pawls 69 from ratchet wheels 68 and permitting shaft 47 to rotate and unwind chains 63.

The use of hoist 21 on various widths of chassis frames is made possible by the adjustability of frame 66 and winding shaft 47 to different spacings of pedestal blocks 48. By positioning frame 66 against the back wall of the cab, hoist 21 occupies a relatively small space and permits the front end of dump body 16 to swing close to the cab.

To prevent dump body 16 from tilting unexpectedly as a result of unequal distribution of the load or rapid driving over bumps and depressions, a latch 73 has been provided. This latch is pivotally mounted on shaft 47 so as to be rotated into engagement with a bar 77, adjustably secured to the front cross sill 23 of dump body 16, as by slotted plate 78 and bolts 79. Latch 73 is actuated by a lever 74, mounted on the front wall of seat box 75, where it is readily accessible. The latch 73 and lever 74 are connected by a rod 76, extending through seat box 75, and the rod is made adjustable by a clamp 81. When lever 74 is pulled back against the front of seat box 75, latch 73 is in contact with bar 77, thereby preventing any tilting movement of the dump body. A pivotally mounted catch 80 engages the upper end of lever 74 to lock said lever and latch 73 against movement.

A chain 82, connecting dump body 16 with one of the side members 19, limits the possible amount of tilting of dump body 16.

I claim as my invention:—

1. A universal hinge mounting for dumping truck bodies comprising, in combination, two pairs of cooperating saddle blocks and hinge plates, each saddle block being wider than the corresponding hinge plate, a hinge rod extending through and adjustably connecting the saddle blocks for application of the saddle blocks to the two side members of chassis frames of variable width and each hinge plate being adjustably pivoted on the hinge rod within the limits of width of the corresponding saddle block for application of the two hinge plates to the sills of dump bodies having differently spaced sills, and projections on the hinge plates normally having supporting engagement with the corresponding saddle blocks independent of the hinge rod.

2. A universal manually operable hoist for dumping truck bodies comprising, in combination, a pair of posts and a horizontal spacing member extending between and connecting the posts at their upper ends, each post being pivotally attached to the spacing member to permit adjustable spacing of the posts at their lower ends, a pedestal block receiving the lower end of the post, clamping means for mounting the pedestal blocks in transverse alignment upon the side members of a chassis frame, a winding shaft extending through and journaled in the pedestal blocks, pulleys mounted upon the posts adjacent their upper ends and a pair of hoisting chains having winding engagement with the shaft and extending over the pulleys.

3. The combination with the winding shaft of a hoist for dumping truck bodies, of a ratchet wheel on the shaft, a longitudinally slotted lever receiving the shaft in its slot and a pawl mounted on the lever adjacent the slot whereby the lever has radial movement upon the shaft for effecting engagement and disengagement of the pawl with the ratchet wheel and angular movement about the shaft for cooperation of the pawl with the ratchet wheel in turning the shaft.

4. A universal manually operable hoist for dumping truck bodies comprising in combination, a pair of posts connected at their upper ends for relative angular movement to permit adjustable spacing of the posts at their lower ends, clamping means for connecting the lower ends of the posts with the side members of a chassis frame in transverse alignment thereon, a transverse winding shaft journaled at the lower ends of the posts, pulleys mounted upon the posts adjacent their upper ends, and a pair of hoisting chains having winding engagement with the shaft and extending over the pulleys.

5. A hoist for a dumping truck body, comprising in combination, a pair of pedestal blocks for mounting on the side frame members of the chassis, a frame constructed for attachment to the rear wall of a cab and adjustable in width at its lower end for attachment to the pedestal blocks, a winding shaft journaled in the pedestal blocks, a pair of pulleys mounted on the frame adjacent its upper end, a pair of hoisting chains having winding engagement with the shaft and extending over the pulleys to tilt the truck body.

6. The combination with the winding shaft of a hoist for dumping truck bodies, of a ratchet wheel on the shaft, a longitudinally slotted lever receiving the shaft in its slot, a pawl mounted on the lever adjacent the slot whereby the lever has radial movement upon the shaft for effecting engagement and disengagement of the pawl with the ratchet wheel and angular movement about the shaft for cooperation of the pawl with the ratchet wheel in turning the shaft, said lever having a hook formed on its outer end, and a holder mounted on the truck for receiving the lever when not in use, said hook and holder thereby cooperating to hold the lever in position to disengage said pawl from said ratchet wheel.

7. The combination with the winding shaft of a hoist for dumping truck bodies, of a ratchet wheel on the shaft adjacent the side of the truck cab, a longitudinally slotted lever receiving the shaft in its slot, a pawl mounted on the lever adjacent the slot whereby the lever has radial movement upon the shaft for effecting engagement and disengagement of the pawl with the ratchet wheel and angular movement about the shaft for cooperation of the pawl with the ratchet wheel in turning the shaft, and a hinge joint in said lever whereby the outer end of the lever can be swung away from the cab.

8. The combination with the winding shaft of a hoist for dumping truck bodies, of a ratchet wheel on the shaft adjacent the side of the truck cab, a lever and pawl having angular movement about the shaft with the pawl cooperating with the shaft to turn the shaft, and a hinge joint in said lever to permit the outer end of the lever to be swung away from the cab.

9. In a hoist for dumping trucks, the combination of a winding shaft, ratchet wheels thereon, pawls for engaging the ratchet wheels, a crank shaft, connecting rods extending between the crank shaft and the pawls and springs yieldingly holding the pawls engaged with the ratchets.

10. The combination with a chassis frame and dumping truck body hinged thereto, of a winding shaft journaled on the chassis frame, a pair of pulleys supported over the shaft, two hoisting chains having winding engagement with different parts of the shaft and each extending over one of the pulleys to the body, and a spacing link connecting the chains between the winding shaft and the pulleys, the length of the link being less than the distance between the two parts of the shaft upon which the two chains are respectively wound.

WALLACE H. McCORMICK.